United States Patent Office 2,805,223
Patented Sept. 3, 1957

2,805,223
METHOD OF PREPARING 2-HYDROXY-
PYRAZINES

Martin E. Hultquist, Boulder, Colo., assignor to American Cyanamid Company, New York, N. Y., a corporation of Maine No Drawing. Application February 14, 1955,
Serial No. 488,161

8 Claims. (Cl. 260—250)

This invention relates to a synthesis of pyrazines. More particularly, it relates to a new method for the preparation of hydroxypyrazines.

It has surprisingly been found that hydroxypyrazines can be prepared by condensing the readily available alpha-amino acid nitriles with dicarbonyl compounds.

An object of my invention is to prepare hydroxypyrazines by an economical process. Another object is to provide a simple process of synthesizing intermediates useful in the preparation of, for example, sulfapyrazines and other pharmaceuticals and in the preparation of dyes and the like.

The process of the present invention is carried out by mixing the amino acid nitriles with the dicarbonyl compound preferably in a solvent. It is desirable to have present an alkaline medium in which the reaction is conducted as higher yields and better results are obtained. This can be assured by using an alkali metal hydroxide or alkaline earth metal hydroxide or an alkali metal alkoxide or the like. Organic bases may also be used such as piperidine, pyridine, triethylamine, trimethylamine and the like.

The desired product can be isolated from the reaction mixture by cooling the mixture and thus precipitating the product or salt thereof or by salting out a salt of the product by addition of sodium chloride, sodium sulfate, etc. The product can also be obtained by neutralizing the reaction mixture and evaporating to dryness preferably under reduced pressure or alternately by reversing these two operations. The desired compound can then be separated by filtration or by extraction and subsequent evaporation of an organic solvent in which the product is soluble. The following equation shows the reaction of the amino acid nitriles and dicarbonyl compounds to produce hydroxypyrazines:

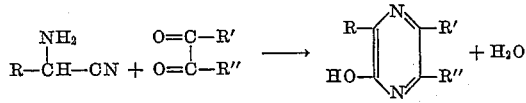

in which R is hydrogen or an alkyl radical and R' and R" are hydrogen, alkyl or monocyclic aryl radicals.

The vicinal dicarbonyl compounds used in the reaction may have both aliphatic and aromatic groups present and can be, for example, glyoxal, methylglyoxal, diacetyl, phenylglyoxal, benzil and dibenzylglyoxal.

The alpha-aminonitriles which are used as starting materials in the present invention are compounds such as glycine nitrile, alpha-alanine nitrile, alpha-aminobutyronitrile, methionine nitrile, alpha-aminovaleronitrile and the like.

In carrying out present reactions, we can use a temperature within the range of about −10° C. to about 100° C. The preferred solvent is water, although an alcohol such as methanol, ethanol, butanol and the like can be used, or mixtures of alcohol and water. The reaction can also be carried out under anhydrous conditions using alcohols or hydrocarbon solvents such as chloroform, benzene, toluene, or xylene.

The reaction of the present invention is usually carried out below room temperature or from about −10° C. to about 15° C. In some instances it may be desirable, after the initial reaction, to heat the reaction mixture to above room temperature to complete the reaction. After the reaction is complete the product can be recovered as herein described.

The following examples illustrate the reaction of amino acid nitriles and dicarbonyl compounds to prepare the hydroxypyrazines of the present invention.

EXAMPLE 1

2-hydroxypyrazine

To a mixture of 38 parts by weight 50% sodium hydroxide and 30 parts by weight of a saturated sodium chloride solution in water, cooled to 0° C., is added a mixture of 24 parts by weight 30% glyoxal and 15.4 parts glycine nitrile sulfate. The temperature of the reaction is held at 0° C. to 10° C. during this addition, which requires about ten minutes. There is added 25 parts sodium chloride, and after cooling to −10° C., the sodium salt of 2-hydroxypyrazine is filtered off, along with some sodium chloride and sodium sulfate and the cake washed with a cold saturated solution of sodium chloride. After drying the filter cake at 60° C., the sodium salt of 2-hydroxypyrazine is dissolved in boiling ethanol, sodium sulfate and sodium chloride are filtered off and the alcohol filtrate is evaporated to dryness. There is obtained the sodium salt of 2-hydroxypyrazine.

EXAMPLE 2

2-hydroxypyrazine

To a solution of 20 parts by volume of 5 N sodium hydroxide and 10 parts ice is added 9.2 parts (0.1 mole) glycine nitrile hydrochloride. This mixture is added to 24 parts by weight of 30% glyoxal solution (0.12 mole) with cooling to keep the temperature at 0 to 10° C. There is then added 20 parts by volume more 5 N sodium hydroxide over 20 minutes to bring the pH to about 12 to 13, while maintaining the temperature at 0° C. to 10° C. After standing 30 minutes at 10° C. to 20° C., the reaction mixture is heated to 50° C., adding 5 N sodium hydroxide as necessary to maintain the pH at 12 to 13. After 10 minutes at 50° C., there is added 20 parts by volume 5 N sodium hydroxide and 30 parts sodium chloride. The reaction mixture is cooled to 0° C. and filtered, and the cake is washed with a little cold saturated sodium chloride solution and dried at 100° C. The dry cake is extracted with two 200 cc. portions boiling anhydrous ethanol; the sodium chloride is filtered off and the alcohol filtrate evaporated to dryness. After drying at 100° C., there is obtained 7 parts of the sodium salt of 2-hydroxypyrazine.

EXAMPLE 3

2-hydroxypyrazine

To a solution of 9 parts by weight 50% sodium hydroxide and 6 parts water cooled to −5° C. is added a mixture of 3 parts glycine nitrile hydrochloride and 8.5 parts by weight 30% glyoxal solution. The temperature is maintained at 0° C. to 10° C. by cooling during this addition, which required about 10 minutes. The crystalline precipitate which separated is filtered off at −5° C. and washed with cold saturated sodium chloride solution. The filter cake (the sodium salt of 2-hydroxypyrazine plus sodium chloride) is slurried in 15 parts by volume anhydrous ethanol and concentrated hydrochloric acid is added until the pH is about 7–7.5. After filtering off the sodium chloride and evaporating to about one-eighth the volume, the solution is cooled to 10° C., filtered and the cake is washed with a little cold anhydrous ethanol. On drying there is obtained 2-hydroxypyrazine, melting at 185°–188° C.

EXAMPLE 4

2-hydroxy-5,6-dimethylpyrazine

To a solution of 40 parts by volume 5 N sodium hydroxide is added at 0° C. to −10° C. 18.5 parts (0.2 mole) glycine nitrile hydrochloride. There is then added at −5° C. to −10° C. via two dropping funnels 16 parts by weight 50% sodium hydroxide and 20 parts (0.23 mole) diacetyl, over 15 minutes. After stirring at 0° C. to 10° C. for two hours, there is added concentrated hydrochloric acid to pH 7–7.5, and the solution is extracted with two 500 cc. parts by volume portions of chloroform. The chloroform is evaporated to dryness after drying with sodium sulfate and the sticky solid is recrystallized from acetone. There is obtained 2-hydroxy-5,6-dimethylpyrazine melting at 195°–200° C.

EXAMPLE 5

2-hydroxy-5,6-diphenylpyrazine

To a solution of 6 parts by weight 50% sodium hydroxide in 20 parts by volume methanol, maintained at 0° C. to −10° C. is added a dry mixture of 4 parts (0.02 mole) benzil and 1.8 parts (0.02 mole) glycine nitrile hydrochloride. After standing two hours at 20° C. to 25° C. the clear solution is diluted to 100 parts by volume with water and the slight turbidity is removed by adding one part activated carbon and filtering. There is then added acetic acid to pH 5–6 and the precipitate is filtered, washed with water and dried. There is obtained four parts of 2-hydroxy-5,6-diphenylpyrazine, melting at 238°–240° C. This is a yield of 80% of theory based on the nitrile.

EXAMPLE 6

2-hydroxy-3-methylpyrazine

To 20 parts by volume saturated sodium chloride in water is added 14 parts (0.2 mole) alpha-alanine nitrile and 48 parts by weight (0.24 mole) 30% glyoxal solution with cooling to keep at 0° C. to 10° C. There is then added, with cooling to keep the mixture at −10° C. to −20° C., 21 parts by weight 50% sodium hydroxide over 30 minutes. The mixture is then warmed to 50° C. and held at 50° C. for 10 minutes and then cooled at 20° C. There is added about 450 parts by weight of 50% sodium hydroxide, the slurry is cooled to 10° C. and the cake is filtered off and washed with a few parts 50% sodium hydroxide solution. The sodium salt cake is slurried in 10 parts water and 36% hydrochloric acid is added (about 18 parts) to bring the pH to 7–7.5. After evaporating the slurry to dryness, the residual cake is extracted with boiling isopropyl acetate and crystallized by cooling. There is obtained 2-hydroxy-3-methylpyrazine as a crystalline solid, melting at 150°–152° C.

EXAMPLE 7

2-hydroxy-3,5,6-trimethylpyrazine

There is mixed with cooling to 0° C. 14 parts by weight (0.2 mole) alpha-alanine nitrile and 16 parts (0.2 mole) diacetyl. After adding 50 parts by volume of methanol there is added 33 parts by weight 50% sodium hydroxide at −10° C. to −20° C. After standing two hours at 20°–25° C., 36% hydrochloric acid is added to pH 7–7.5. The solution is evaporated to a volume of 60 parts and the sirupy residue extracted with two 100 parts (by volume) of chloroform. The chloroform solution is evaporated to dryness, and the residue is recrystallized from 100 parts isopropyl acetate. There is obtained 2-hydroxy-3,5,6-trimethylpyrazine as cream-colored crystals, melting at 200° C.–201° C.

EXAMPLE 8

2-hydroxy-3-methyl-5,6-diphenylpyrazine

To a solution of 16.5 parts by weight 50% sodium hydroxide in 100 parts by volume methanol is added a mixture of 21 parts (0.1 mole) benzil with 7 parts alpha-alanine nitrile, maintaining the temperature at −10° C. to −20° C. After standing for two hours at 20° C. −25° C., the resulting clear, orange-yellow solution is diluted with 500 parts cold water and acidified to pH 7 with hydrochloric acid. The yellow solid is filtered off and dried. When recrystallized from acetone it melts at 212.5° C.–213.5° C.

EXAMPLE 9

5,6-diphenyl-2-hydroxypyrazine

Benzil, 210 parts, glycinonitrile, 56 parts, and sodium methylate, 60 parts, are dissolved in anhydrous methanol, 1600 parts, and the solution refluxed for two hours. The methanol is then removed by evaporation at room temperature. The residue from this operation is then dissolved in water, 2500 parts, and the resulting solution treated with decolorizing carbon, clarified, and acidified with acetic acid. The precipitate which separates is filtered off, washed with water and dried to give 200 parts of 5,6-diphenyl-2-hydroxypyrazine.

EXAMPLE 10

5,6-diphenyl-2-hydroxy-3-methylpyrazine

To a solution of 2.1 parts (0.01 mole) benzil, 20 parts anhydrous methanol and 0.7 part (0.01 mole) alpha-aminopropionitrile is added 0.6 part (0.01 mole) sodium methylate. The mixture is heated at reflux for two hours, then evaporated to dryness by means of a stream of air. The residue is dissolved in 25 parts water and clarified with activated charcoal. The filtrate is acidified with glacial acetic acid and a slightly gummy solid is obtained. The supernatant liquor is decanted, the solid is dissolved in 36 parts ethanol at 50° C. and clarified with activated charcoal. The filtrate is diluted with 200 parts water and on standing, a yellow solid is obtained. The solid is filtered and a portion recrystallized from acetone yields 5,6-diphenyl-2-hydroxy-3-methylpyrazine in the form of colorless needles melting at 212° C.–213° C.

EXAMPLE 11

5,6-diphenyl-2-hydroxypyrazine

To a solution of 2.1 parts (0.01 mole) benzil, 37 parts anhydrous chloroform and 0.56 part (0.01 mole) glycinonitrile is added 0.6 part (0.01 mole) sodium methylate over a ten minute period. The mixture is heated at reflux for 1.5 hours, then evaporated to dryness by means of a stream of air. The dark red oil is dissolved in 20 parts ethanol, heated to 60° C. and clarified with activated charcoal. The filtrate is acidified with glacial acetic acid and a yellow solid is precipitated. It is recrystallized from 60 parts ethanol. The material isolated by filtration is dried at 50° C. to give 5,6-diphenyl-2-hydroxypyrazine, melting at 235° C.–236° C.

I claim:

1. A method of preparing compounds having the general formula:

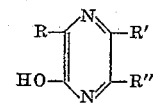

in which R is a member of the group consisting of hydrogen and lower alkyl radicals and R′ and R″ are members of the group consisting of hydrogen, lower alkyl and phenyl radicals which comprises reacting a member of the group consisting of an alpha amino lower alkyl nitrile and acid salts thereof with a dicarbonyl compound having the formula:

$$O=C-R'$$
$$O=C-R''$$

in which R' and R'' are as defined above.

2. A method of preparing a 2-hydroxy-3,5,6-triloweralkylpyrazine which comprises reacting an alpha aminoloweralkyl nitrile with a vicinal dicarbonyldiloweralkyl compound under alkaline conditions.

3. A method of preparing a 2-hydroxy-3-lower alkylpyrazine which comprises reacting an alpha aminoloweralkyl nitrile with glyoxal under alkyline conditions.

4. A method of preparing 2-hydroxy-pyrazine which comprises reacting glycine nitrile with glyoxal in the presence of an aqueous alkaline solution.

5. A method of preparing 2-hydroxy-5,6-dimethylpyrazine which comprises reacting glycine nitrile with diacetyl in the presence of an aqueous alkaline solution.

6. A method of preparing 2-hydroxy-5,6-diphenylpyrazine which comprises reacting glycine nitrile with benzil.

7. A method of preparing 2-hydroxy-3-methylpyrazine which comprises reacting alpha-alanine nitrile with glyoxal in the presence of an aqueous alkaline solution.

8. A method of preparing 2-hydroxy-3,5,6-trimethylpyrazine which comprises reacting alpha-alanine nitrile with diacetyl in the presence of an aqueous alcoholic alkaline solution.

References Cited in the file of this patent

UNITED STATES PATENTS 2,520,088      Jones _____ Aug. 22, 1950

OTHER REFERENCES

Richter: Textbook of Organic Chemistry, 1938 Ed., p. 205, John Wiley and Sons, N. Y., N. Y.

Newbold et al.: J. Chem. Soc., 1951, 2679–82.